(12) United States Patent
Huang

(10) Patent No.: US 9,556,344 B2
(45) Date of Patent: Jan. 31, 2017

(54) PLASTIC PROTECTIVE COMPOSITION AND PROCESS FOR USE THEREOF

(71) Applicant: ILLINOIS TOOL WORKS, INC., Glenview, IL (US)

(72) Inventor: Tsao-Chin Clarence Huang, Katy, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 500 days.

(21) Appl. No.: 13/837,319

(22) Filed: Mar. 15, 2013

(65) Prior Publication Data

US 2014/0272192 A1 Sep. 18, 2014

(51) Int. Cl.
 *C09D 5/32* (2006.01)
 *C09D 191/00* (2006.01)
 *C08K 5/00* (2006.01)
 *C08K 5/34* (2006.01)

(52) U.S. Cl.
 CPC .............. *C09D 5/32* (2013.01); *C08K 5/005* (2013.01); *C08K 5/34* (2013.01); *C09D 191/00* (2013.01)

(58) Field of Classification Search
 None
 See application file for complete search history.

(56) References Cited

U.S. PATENT DOCUMENTS

| 3,309,219 | A | * | 3/1967 | Etherington | ................. 428/412 |
| 4,683,001 | A | * | 7/1987 | Floyd | ....................... C09G 1/10 106/10 |
| 9,034,220 | B2 | * | 5/2015 | Winget et al. | ............... 252/588 |
| 2007/0096060 | A1 | * | 5/2007 | Arafat et al. | ................ 252/387 |

* cited by examiner

*Primary Examiner* — Joseph D Anthony
(74) *Attorney, Agent, or Firm* — Avery N. Goldstein; Blue Filament Law PLLC

(57) ABSTRACT

A process for protecting a plastic substrate from ultraviolet electromagnetic radiation is provided that includes the application of a composition to the plastic substrate containing between 0.01 and 10 total weight percent of a UV absorber in a non-polymerizing oil present in an amount of greater than 50 total weight percent. The oil is allowed to form a protective layer on the plastic substrate and having said UV absorber dispersed therethrough. The composition is provided including other additives and a volatile organic solvent. The oil and additives are chosen to not produce a colored byproduct as observed by an unaided normal human eye. Compositions are also provided that are limited to the aforementioned components of a UV absorber, an oil, with or without an organic solvent and limited additive to preclude staining of the plastic substrate.

9 Claims, No Drawings

US 9,556,344 B2

PLASTIC PROTECTIVE COMPOSITION AND PROCESS FOR USE THEREOF

FIELD OF THE INVENTION

The present invention in general relates to hydrophobic compositions applied to plastic substrates to inhibit radiation damage associated with ultraviolet (UV) radiation; and in particular to such compositions applied to vehicle trim.

BACKGROUND OF THE INVENTION

There is a growing trend in the replacement of metal and wood components in vehicles and building structures with plastics. Exemplary of the inroads made by plastic components supplanting other materials are automotive trim, building window trim, and pick up truck bed liners. Unfortunately, functionality in such polymers are susceptible to ultraviolet light exposure damage through bond cleavage and dye oxidation. UV weathered plastics are characterized by color fading, cracking, or becoming tacky, instances where the molecule weight of plastic is reduced.

Historically, attempts to restore the appearance of plastics that have been weathered by UV light exposure have included the application of a plastic surface dressing that temporarily changes the plastic appearance with a dye composition tends to only last a few days before reapplication is required, to apply a dye that permanently affixes to the plastic, or to paint the plastic with a paint specifically designed for plastic surfaces. While dying or painting the UV light degraded plastic surface require considerable preparation, equipment and skill; surface dressing is easily performed with resort simply to a towel, foam pad, or other similar applicator. Unfortunately, surface dressing has a limited restorative effect as a result of water contact such as rain removing the surface dressing compositions, the formation of ring spots on the treated plastic, or a combination of these effects. Additionally, surface dressings tend to fade in appearance with each exposure to rain with little, if any surface dressings lasting more than a few weeks. The resulting plastic also tends to become sticky with repeated usage of conventional surface dressing compositions. Also, as surface dressings have no resistance to ultraviolet damage, even between periods of rainfall, the dressing compositions are themselves quickly degraded.

Thus, there exists a need for a protective composition and process for the use thereof to protect plastics that are exposed to UV light damage. There further exists a need for such a composition specifically for protection of plastic interior and exterior portions of a vehicle that is compatible with vehicle materials and operating conditions.

SUMMARY OF THE INVENTION

A process for protecting a plastic substrate from ultraviolet electromagnetic radiation is provided that includes the application of a composition to the plastic substrate containing between 0.01 and 10 total weight percent of a UV absorber in a non-polymerizing oil present in an amount of greater than 50 total weight percent. The oil is allowed to form a protective layer on the plastic substrate and having said UV absorber dispersed therethrough.

A composition is also provided including other additives and a volatile organic solvent. The oil and additives are chosen to not produce a colored byproduct as observed by an unaided normal human eye. Compositions are also provided that are limited to the aforementioned components of a UV absorber, an oil, with or without an organic solvent and limited additive to preclude staining of the plastic substrate. The composition is well suited to protect vehicle exterior trim, building window trim and vehicle dashboards.

DETAILED DESCRIPTION OF THE PREFERRED EMBODIMENTS

The present invention has utility as a protective composition containing a UV absorber that is able to absorb at least portions of both UV-A and UV-B spectral wavelengths. UV-A and UV-B spectral wavelengths are between 320-400 nm and 280-320 nm, respectively. The UV absorber is dissolved in a non-polymerizing oil. The oil creates a surface coating on the plastic substrate that is hydrophobic and as a result not prone to removal by rain while the UV absorber protects the underlying plastic substrate from ultraviolet radiation. Through selection of the oil, an inventive composition either imparts a matte finish or a high gloss restorative appearance to plastic substrates so treated. An inventive composition is readily applied at ambient outdoor temperatures to a plastic substrate with a towel, foam pad, synthetic chamois, or microfiber towelette.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

UV absorbers operative herein for protecting an underlying substrate have the ability to absorb electromagnetic radiation with at least some wavelengths between 280 nm and 400 nm. Inventive compositions in certain embodiments are particularly well-suited to absorb radiation from about 280 nm to about 380 nm with the inclusion of appropriate UV absorbers, as these wavelengths are particularly damaging to many categories of automotive trim plastics and building window trim.

Several classes UV absorbers are known, and these include sterically hindered amines, anthranilates, benzophenones, benzotriazoles, camphors, cinnamates, imidazoles, aminobenzoic acids, phenols, phenyl thiazines, quinones, salicylates, titania particulate, triazoles, and zinc oxide particulates. It is appreciated that a single UV absorber is readily used, a mixture of compounds from within a given class of absorbers, or compounds from several classes to afford a desired degree of UV absorption. In certain embodiments of the present invention, the UV absorber is benzotriazole alone, while in other embodiments, a blend of benzotriazole and a hindered amine, such as a derivative of 2,2,6,6-tetramethyl piperidine are used in combination. A UV absorber is readily evaluated for UV transmission by transmission absorption spectroscopy using Beer's law. By way of example, a 1 centimeter (cm) quartz cuvette filled with toluene contains a candidate UV absorber in a concentration of 10 mg/L of the candidate material with absorbents measured against a toluene filled blank cuvette that does not contain candidate UV absorber. Particularly well suited are UV absorbers present in amounts that transmit less than 10% of the integrated area of wavelengths between 290 nm and 400 nm. Particular emphasis on the UV-A portion of the electromagnetic radiation spectrum favors protection of plastic substrates.

Specific benzotriazole UV absorbers operative in the present invention include 2-(2H-benzotriazol-2-yl)-4,6-ditertpentylphenol. Specific hindered amine UV absorbers operative in the present invention illustrative include Bis(1-octyloxy-2,2,6-tetramethyl-4-piperidyl)sebacate. A UV absorber, or a combination of UV absorbers are present in an inventive composition an amount of from 0.01 to 10 total weight percent of the composition. Particular embodiments of the present invention are formulated for protection of vehicle plastic trim, UV absorber levels are typically between 0.03 and 0.3 total weight percent.

The oil component of an inventive composition serves to solubilize the UV absorber, that acts as a carrier for the UV absorber into the topography associated with the plastic substrate surface to which an inventive composition is applied, as well as forming a hydrophobic liquid layer on the plastic substrate. A critical requirement of an oil used in inventive composition is that the oil does not degrade to form byproducts that appear colored to a normal, unaided human eye. Generally, an oil suitable for usage in an inventive composition is either paraffinic oil or naphthenic oil or the combination of both.

Without intending to be bound to a particular theory, nonaromatic carbon-carbon double bonds are prone to ozonolysis and free-radical degradation through exposure to solar radiation and smog and as such are disfavored in an oil. Oils particularly well suited for use in inventive composition are paraffinic oil or naphthenic oil or the combination of both hydrocarbon oils, polysiloxanes, each alone or in combination with the other oils. Polysiloxanes operative herein include polydimethyl siloxane, amino functional polysiloxane, amino-methoxy functional polysiloxane, polydimethyl siloxane fluid, and polydimethyl siloxane gum.

The oil in an inventive composition is typically present from 50 to 99.99 total weight percent and has a viscosity at room temperature of between 350 and 500,000 centiStokes (cSt). It is appreciated that the higher viscosity range of oils, while forming higher gloss layers in a plastic substrate that are not readily removed by water have a reduced ability to penetrate topography associated with that plastic substrate surface, as compared to lower viscosity oils. It is appreciated that properties of an inventive composition on a plastic substrate are readily adjusted through resort to a mixture of oils that vary in viscosity or through inclusion of an organic solvent that is miscible with the oil and the UV absorber so as to reduce the overall viscosity of an inventive composition and upon evaporation of the organic solvent to obtain a higher viscosity oil as well as the UV absorber. Organic solvents operative herein. Hydrotreated heavy petroleum naphtha or hydrotreated light petroleum distillate. Organic solvent, if present, is typically used in amounts of from 1 to 49 total weight percent.

An inventive composition is amendable to inclusion of a variety of additives with the proviso that such additives allow the inventive composition to remain effective in protecting an underlying plastic substrate from UV light as well as not forming byproducts that are colored to the unaided, normal human eye. Additives suitable for inclusion in an inventive composition illustrative include fragrances, wax emulsions, such as those including carnauba wax; free-radical scavengers; wetting agents, leveling agents, and defoaming agents.

In certain embodiments of the present invention, composition is limited only to the UV absorber, the oil, and an optional fragrance to preclude staining of the underlying plastic substrate.

In still other embodiments of the present invention, composition is limited to a benzotriazol UV absorber, and oil, and an optional fragrance. While in still other embodiments of the present invention, the composition is limited to a UV absorber, a polysiloxane oil having a molecular weight of greater than 50,000 cSt, and an organic solvent. In certain embodiments, an invention composition as applied to a plastic substrate yields a protective film that has an initial gloss and a later gloss 2 weeks after formation of said protective film, the later gloss being greater than 50% of the initial gloss The present invention is further described with reference to the following non-limiting examples. These examples are not intended to limit the scope of the append claims but rather to illustrate the formulation and properties of specific compositions in the use thereof according to the present invention.

EXAMPLE 1

To a paraffinic oil, fragrance and 3-(2H-benzotriazol-2-yl)-5-(1,1-dimethylethyl)-4-hydroxy-benzene propanoate $C_7$-$C_9$ ester are added such that the fragrance represents 0.3 total weight percent and the benzotriazol represents 0.1 total weight percent. Various automotive trim parts made from ABS/PVC, polypropylene, polyurethane, or ABS polymers had typical shine levels of 10.3 gloss units based on five averaged tests and immediately after application of the above composition had a shine level of 40.4 gloss units based on 5 repetitive tests. The gloss remains above 30 gloss units two weeks thereafter.

EXAMPLE 2

The composition and testing of Example 1 are repeated with the exception that the benzotriazol is present at 1 total weight percent and the fragrance is omitted with a comparable result to that of Example 1.

EXAMPLE 3

The composition and testing of Example 1 are repeated with the exception that the benzotriazole is replaced with a mixture of 2-(2H-benzotriazol-2-yl)-4,6-ditertpentylphenol at 0.1 total weight percent with a comparable result to Example 1.

EXAMPLE 4

To a solution of 53.60 total weight percent 100,000 cSt polydimethylsiloxane oil and 46.00 total weight percent hydrotreated heavy petroleum naphtha or hydrotreated light petroleum distillate, fragrance and 3-(2H-benzotriazol-2-yl)-5-(1,1-dimethylethyl)-4-hydroxy-benzene propanoate $C_7$-$C_9$ ester are added such that the fragrance represents 0.3 total weight percent and the benzotriazol represents 0.1 total weight percent. Various automotive trim parts made from ABS/PVC, polypropylene, polyurethane, or ABS polymers had typical shine levels of 8.7 gloss units based on five averaged tests and immediately after application of the above composition had a shine level of 71.3 gloss units based on 5 repetitive tests. The gloss remains above 50 gloss united two weeks thereafter.

EXAMPLE 5

The composition and testing of Example 4 are repeated with the exception that the benzotriazol is present at 1 total weight percent and the fragrance is omitted with a comparable result to that of Example 4.

EXAMPLE 6

The composition and testing of Example 4 are repeated with the exception that the benzotriazole is replaced with 2-(2'-hydroxy-3'5'-di-tert-amylphenyl)benzotriazole 0.1 total weight percent with a comparable result to Example 4.

EXAMPLE 7

The composition and testing of Example 4 are repeated with the exception that the PDMS is replaced with 30,000 cSt PDMS and the solvent omitted with a comparable result to Example 4.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A composition comprising:
   0.1 to 10 total weight percent of a UV absorber;
   an organic solvent that constitutes from 1 to 49 total weight percent of said composition, said organic solvent being heavy petroleum naphtha or hydrotreated light petroleum distillate; and
   a non-polymerizable oil present in an amount of greater than 50 total weight percent in which said UV absorber is dissolved, said oil being paraffinic oil, naphthenic oil, polysiloxanes, each alone or in combination, said oil having a viscosity at room temperature of between 350 and 500,000 centiStokes.

2. The composition of claim 1 wherein said UV absorber is a triazole, a benzotriazole, or a combination thereof.

3. The composition of claim 1 wherein said UV absorber is only a benzotriazole.

4. The composition of claim 3 wherein said benzotriazole is present from 0.1 to 1 total weight percent.

5. The composition of claim 1 wherein said oil is a polysiloxane or a UV stable alkane oil, said oil having a room temperature viscosity of between 10,000 and 500,000 centiStokes.

6. A composition consisting essentially of:
   0.1 to 10 total weight percent of a UV absorber;
   a non-polymerizable oil present in an amount of greater than 50 total weight percent in which said UV absorber is dissolved, said oil being paraffinic oil, naphthenic oil, polysiloxanes, each alone or in combination, said oil having a viscosity at room temperature of between 350 and 500,000 centiStokes;
   an organic solvent that constitutes from 1 to 49 total weight percent of said composition, said organic solvent being heavy petroleum naphtha or hydrotreated light petroleum distillate; and
   an optional additive of at least one of fragrance, a wax emulsion, a free-radical scavenger, a wetting agent, a leveling agent, or a defoaming agent.

7. The composition of claim 6 wherein said UV absorber is a triazole, a benzotriazole, or a combination thereof.

8. The composition of claim 6 wherein said UV absorber is only a benzotriazole.

9. The composition of claim 6 wherein said oil is a polysiloxane or a UV stable alkane oil, said oil having a room temperature viscosity of between 10,000 and 500,000 centiStokes.

* * * * *